(12) United States Patent
Kawakatsu et al.

(10) Patent No.: US 6,752,721 B2
(45) Date of Patent: Jun. 22, 2004

(54) CONSTANT VELOCITY UNIVERSAL JOINT

(75) Inventors: Tsutomu Kawakatsu, Mooka (JP);
Shouichi Nakao, Mooka (JP); Satoru Kudo, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 14 days.

(21) Appl. No.: 10/034,130

(22) Filed: Jan. 3, 2002

(65) Prior Publication Data

US 2002/0128077 A1 Sep. 12, 2002

(30) Foreign Application Priority Data

Jan. 19, 2001 (JP) .......................................... 2001-012155
Jan. 19, 2001 (JP) .......................................... 2001-012174

(51) Int. Cl.[7] ................................................. F16D 3/205
(52) U.S. Cl. ........................................ 464/111; 464/905
(58) Field of Search .................................. 464/111, 124, 464/905

(56) References Cited

U.S. PATENT DOCUMENTS

| | | | | |
|---|---|---|---|---|
| 4,747,803 A | * | 5/1988 | Kimata et al. ............... | 464/111 |
| 5,069,653 A | * | 12/1991 | Mizukoshi ................... | 464/111 |
| 5,199,925 A | * | 4/1993 | Welschof ..................... | 464/111 |
| 5,256,107 A | * | 10/1993 | Matsumoto et al. ..... | 464/905 X |
| 5,290,202 A | * | 3/1994 | Orain .......................... | 464/111 |
| 5,538,473 A | | 7/1996 | Busch et al. | |
| 5,935,009 A | | 8/1999 | Hozdez et al. | |

FOREIGN PATENT DOCUMENTS

| | | |
|---|---|---|
| DE | 198 34 142 A1 | 2/2000 |
| GB | 2 226 102 A | 6/1990 |
| JP | 63-158327 A | 7/1988 |
| JP | 7-103251 A | 4/1995 |
| JP | 11-336783 | 12/1999 |
| WO | 90/07067 | 6/1990 |

OTHER PUBLICATIONS

Merriam–Webster's Collegiate Dictionary, 10th ed., Merriam–Webster, Inc., Springfield, MA, 1998, p. 375.*

* cited by examiner

*Primary Examiner*—Greg Binda
(74) *Attorney, Agent, or Firm*—Birch, Stewart, Kolasch & Birch, LLP

(57) ABSTRACT

A variety of cutout surfaces are formed on trunnions by cutting out parts of a spherical surface of each of the trunnions, to which no torque is applied. The cutout surfaces comprise a pair of opposite flat surface sections, bores, recesses or wide flat surfaces, and curved surface sections, for example.

9 Claims, 24 Drawing Sheets

CONSTANT VELOCITY UNIVERSAL JOINT

BACKGROUND OF THE INVENTION

1. Field of the Invention

The present invention relates to a constant velocity universal joint for connecting a first shaft as one transmission shaft and a second shaft as the other transmission shaft, for example, in a driving force-transmitting section of an automobile.

2. Description of the Related Art

Constant velocity universal joints are commonly used in motor vehicle applications. The constant velocity universal joint is disposed in a driving force-transmitting section of an automobile for connecting a first shaft as one transmission shaft and a second shaft as the other transmission shaft so that a rotary force is transmitted to respective axles.

The present applicant has proposed a constant velocity universal joint and an assembling method thereof in U.S. patent application Ser. Nos. 09/456,488 and 09/984,898, now U.S. Pat. Nos. 6,454,655 and 6,497,621, respectively. According to the constant velocity universal joint, induced thrust performance and durability are improved by reducing slide resistance generated when one transmission shaft is tilted and a trunnion is displaced along a guide track. The present invention has been made in relation to this proposal.

SUMMARY OF THE INVENTION

A general object of the present invention is to provide a constant velocity universal joint which makes it possible to easily assemble a trunnion and an annular member. The trunnion has a spherical surface along the circumferential direction thereof. The spherical surface is partially cut out into a variety of shapes. The annular member has a spherical recess having an inner circumferential surface corresponding to the spherical surface.

A principal object of the present invention is to provide a constant velocity universal joint which makes it possible to assemble a trunnion and an annular member regardless of orientation of assembling components.

Another object of the present invention is to provide a constant velocity universal joint having improved lubrication performance on a sliding plane between a spherical surface of a trunnion and a spherical recess of an annular member.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

According to the present invention, a cutout surface, which may take a variety of shapes, is formed by partially cutting out a spherical surface of each trunnion. As described later on, the cutout surface is formed at a portion of the trunnion to which no torque is applied. International Patent Publication No. WO 90/07067 and Japanese Laid-Open Patent Publication No. 7-103251 disclose a cutout flat surface made in an outer spherical surface of a trunnion.

According to the disclosure of International Patent Publication No. WO 90/07067 and Japanese Laid-Open Patent Publication No. 7-103251, when a ring-shaped roller is installed to the trunnion having the spherical surface, the roller is fitted to the spherical trunnion in a state in which the roller is elastically deformed under pressure. In contrast, according to the present invention, an inner roller is not elastically deformed in installing a spherical trunnion to a spherical surface of the inner roller. Therefore, the installation can be performed easily.

Further, in Japanese Laid-Open Patent Publication No. 7-103251, the flat surface section is formed on the part of the spherical surface to which the torque of the trunnion is applied. In contrast, according to the present invention, a flat surface section or the like is formed on a part of the spherical surface, to which no torque of the trunnion is applied.

It will be apparent from the detailed description given below that the technical concept of the present invention is significantly different from the technical concept disclosed in International Patent Publication No. WO 90/07067 and Japanese Laid-Open Patent Publication No. 7-103251 in terms of the arrangement, function, and effect. Preferred embodiments of the constant velocity universal joint according to the present invention will be described below.

Figure 1:
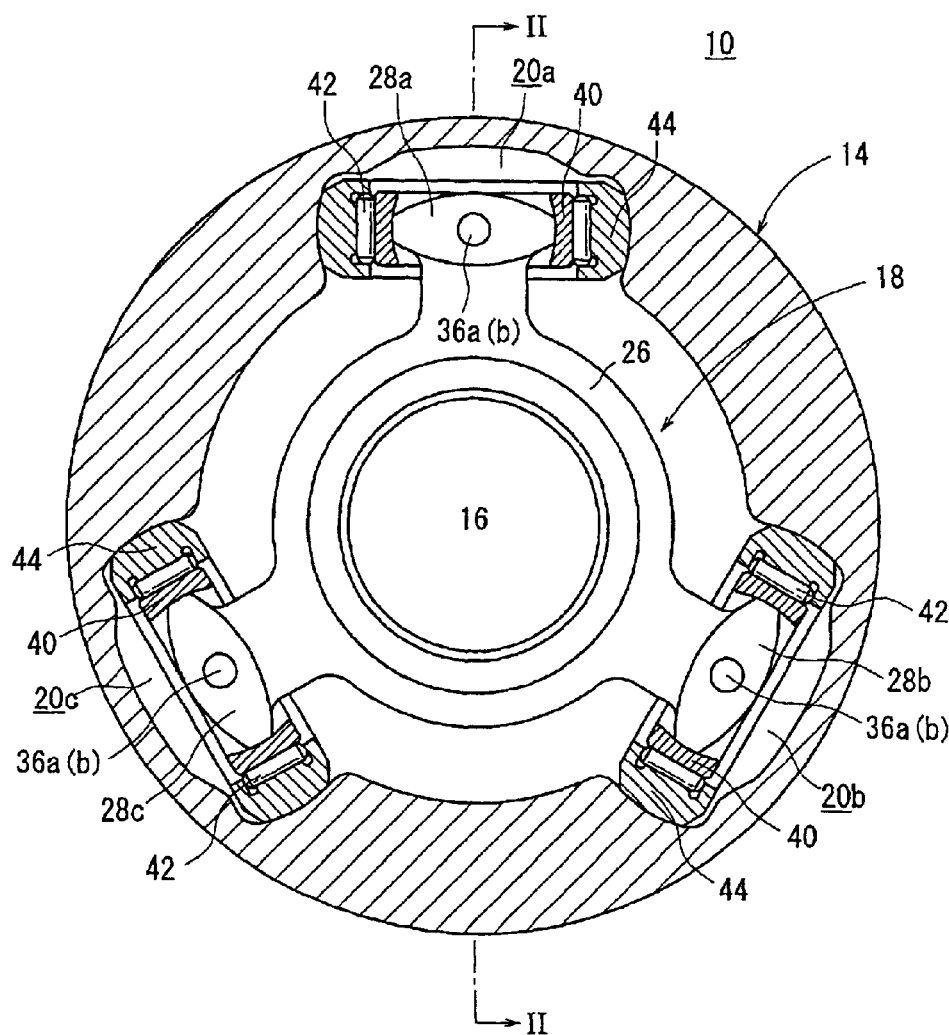
FIG. 1 is a vertical sectional view showing a constant velocity universal joint, in a direction substantially perpendicular to an axis of the constant velocity universal joint, according to a first embodiment of the present invention.
Figure 2:
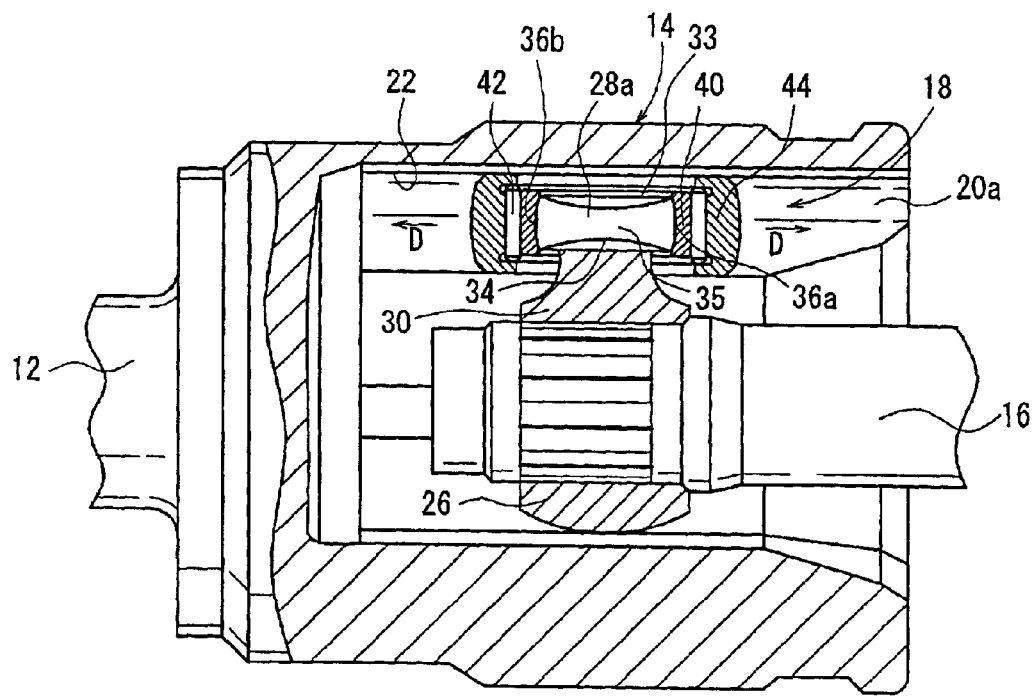
FIG. 2 is a vertical sectional view showing the constant velocity universal joint taken along a line II—II shown in FIG. 1.

With reference to FIGS. 1 and 2, reference numeral 10 indicates a constant velocity universal joint according to a first embodiment of the present invention.

The constant velocity universal joint 10 comprises a cylindrical outer cup (outer member) 14 which has an opening and which is integrally connected to one end of a first shaft 12 (shown in FIG. 2 with partial omission) as one transmission shaft, and an inner member 18 which is secured to one end of a second shaft 16 as the other transmission shaft and which is accommodated in the opening of the outer cup 14.

Figure 3:
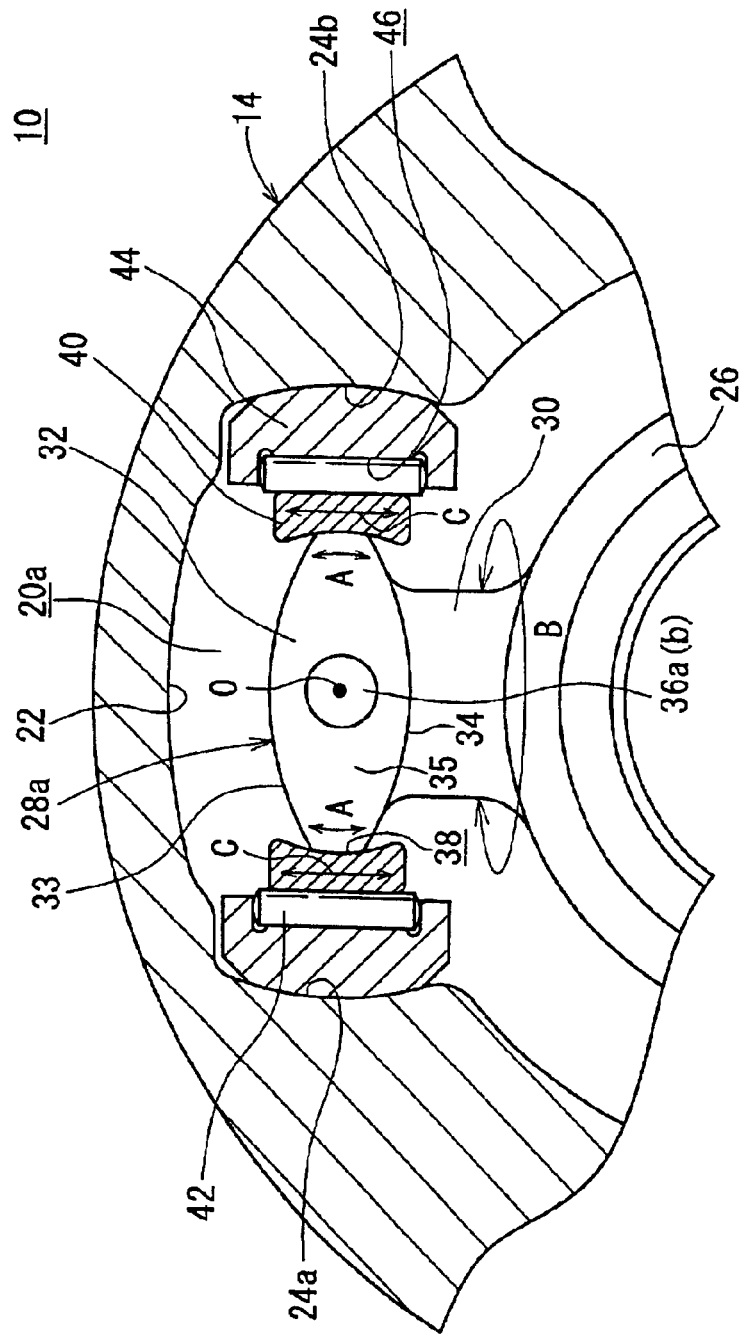
FIG. 3 is a magnified vertical sectional view with partial omission showing the constant velocity universal joint shown in FIG. 1.

As shown in FIG. 1, three guide grooves 20a to 20c, which extend in the axial direction and which are spaced apart by about 120 degrees respectively about the axial center, are formed on the inner wall surface of the outer cup 14. As shown in FIG. 3, each of the guide grooves 20a to 20c includes a ceiling section 22, and side surface sections 24a, 24b formed on opposite sides of the ceiling section 22. The ceiling section 22 has a recess curved along the outer circumferential surface of the outer cup 14. Each of the side surface sections 24a, 24b have an arc-shaped curved surface in cross section.

As shown in FIG. 1, a ring-shaped spider boss section 26 is externally fitted to the second shaft 16. Three trunnions 28a to 28c, which are expanded toward the guide grooves 20a to 20c respectively and which are spaced apart by about 120 degrees about the axial center, are integrally formed on the outer circumferential surface of the spider boss section 26.

As shown in FIG. 3, each of the trunnions 28a to 28c comprises a neck 30 which is expanded radially outwardly from the ring-shaped spider boss section 26, and a head 32 which is formed integrally with the neck 30.

A first curved surface 33, which has an arc-shape with a predetermined curvature as viewed in the axial direction of the outer cup 14 (see FIG. 3) and which is formed linearly as viewed in the direction substantially perpendicular to the axis of the outer cup 14 (see FIG. 2), is provided on the upper surface of the head 32. The shape of the first curved surface 33 is not limited to the linear configuration as viewed in the direction substantially perpendicular to the axis of the outer cup 14. The first curved surface 33 may have an arc shape having a predetermined curvature as viewed in the direction substantially perpendicular to the axis of the outer cup 14.

A second curved surface 34, which is similar to the first curved surface 33 described above, is formed on the lower surface of the head 32. The second curved surface 34 is continued to the neck 30. The head 32 further has a spherical surface 35 on the outer circumferential surface between the first curved surface 33 and the second curved surface 34. An unillustrated chamfered section having a curved cross section may be provided at a boundary portion between the first curved surface 33 and the spherical surface 35 and at a boundary portion between the second curved surface 34 and the spherical surface 35.

Figure 4:
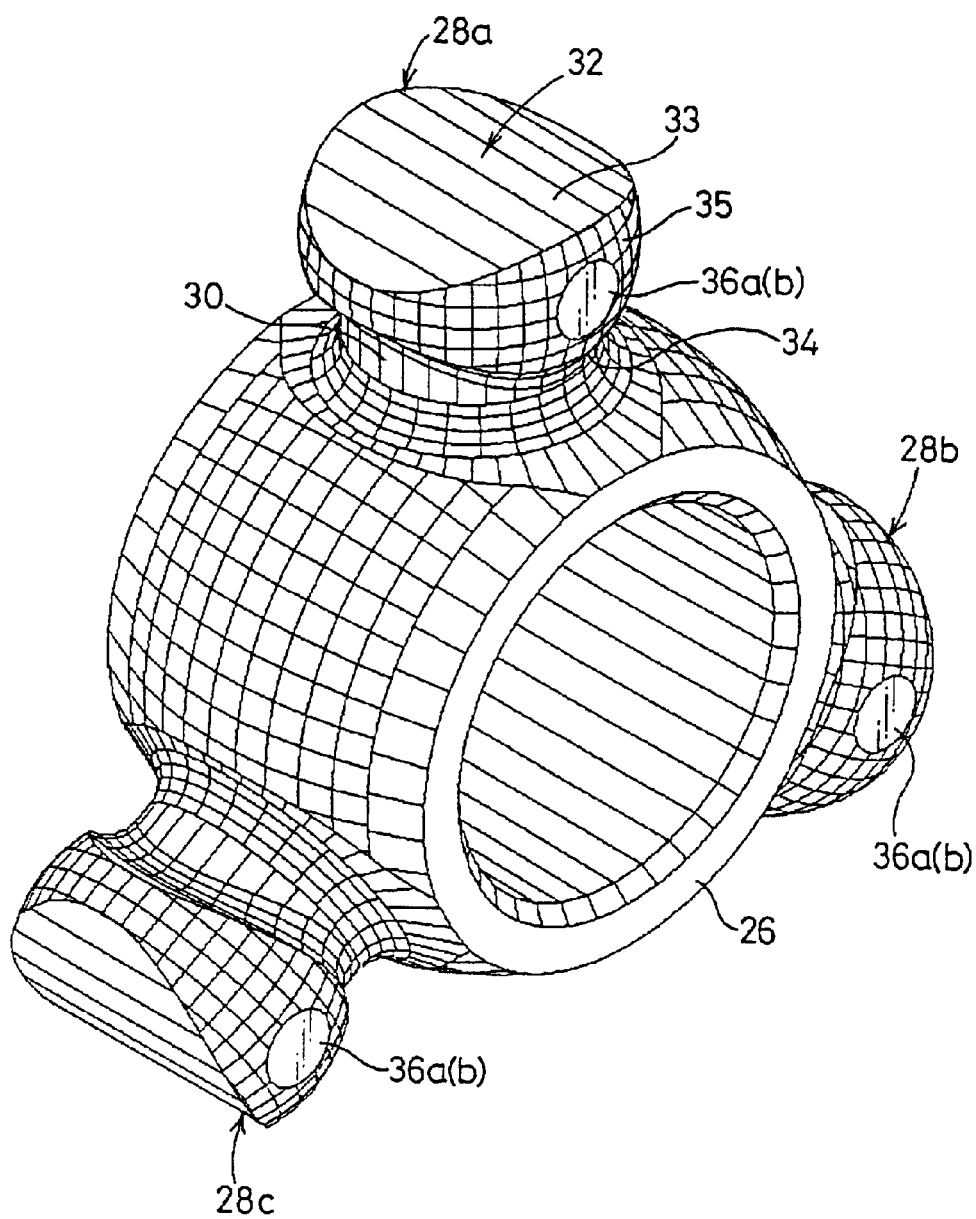
FIG. 4 is a magnified perspective view showing a plurality of trunnions including a spider boss section of the constant velocity universal joint shown in FIG. 1.
Figure 5:
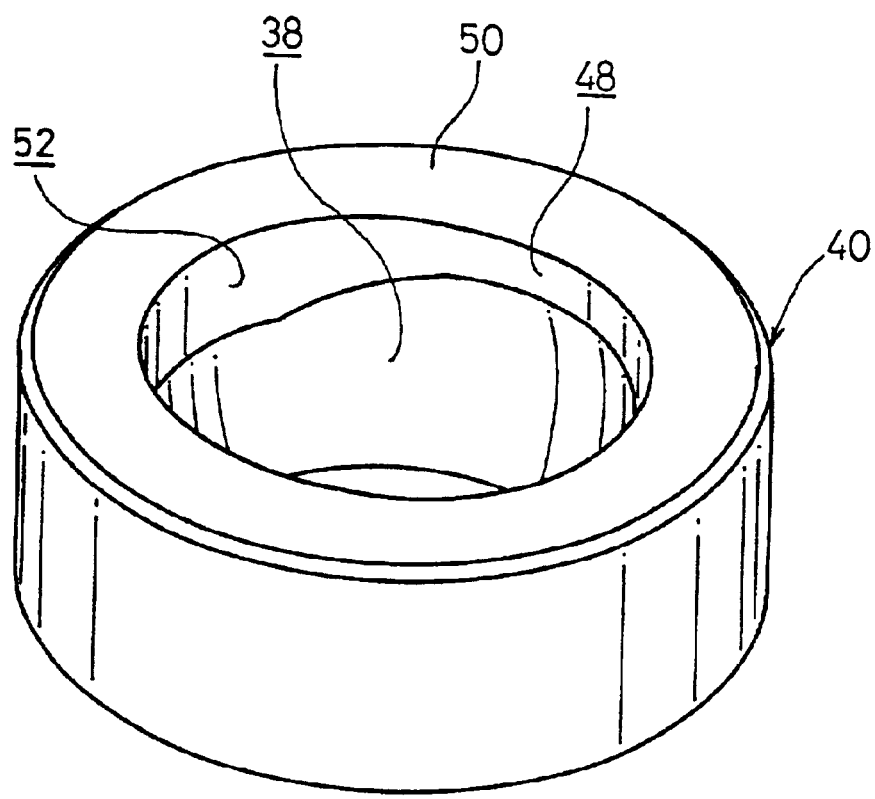
FIG. 5 is a perspective view showing an inner roller to be installed to the trunnion shown in FIG. 4.

As shown in FIG. 4, a pair of substantially circular flat surface sections (cutout surfaces) 36a, 36b are formed oppositely on parts of the spherical surface 35, to which no torque between the first curved surface 33 and the second curved surface 34 of the head 32 is applied. The entire circumferential edge of the cutout surfaces 36a, 36b being in contact with the spherical surface 35. The trunnions 28a to 28c are rotated in the circumferential direction of the spider boss section 26. Therefore, the torque is applied to other parts of the spherical surfaces 35 of the trunnions 28a to 28c in the circumferential direction of the spider boss section 26.

As shown in FIG. 3, an inner roller (annular member) 40 and an outer roller 44 are disposed between the trunnion 28a to 28c and the side surface sections 24a, 24b. The inner roller 40 is a ring member having a spherical recess 38 corresponding to the spherical surface 35 of the trunnion 28a to 28c over the entire inner circumferential surface. The outer roller 44 is externally fitted to the inner roller 40 with a plurality of needle bearings 42 interposed therebetween. The outer circumferential surface of the outer roller 44 has an arc-shaped cross section corresponding to the side surface sections 24a, 24b of the guide groove 20a to 20c. The outer circumferential surface of the outer roller 44 and the side surface sections 24a, 24b of the guide groove 20a to 20c make surface-to-surface contact with each other.

The cross-sectional configurations of the outer circumferential surface of the outer roller 44 and the side surface sections 24a, 24b of the guide groove 20a, 20b are not limited to the arc-shaped configurations respectively. Each of these components may have a linear cross section.

The plurality of needle bearings 42 are rollably installed into an inner annular recess 46 of the outer roller 44. The plurality of needle bearings 42 may be installed using the keystone effect so that they are not disengaged from the recess 46.

Figure 6:
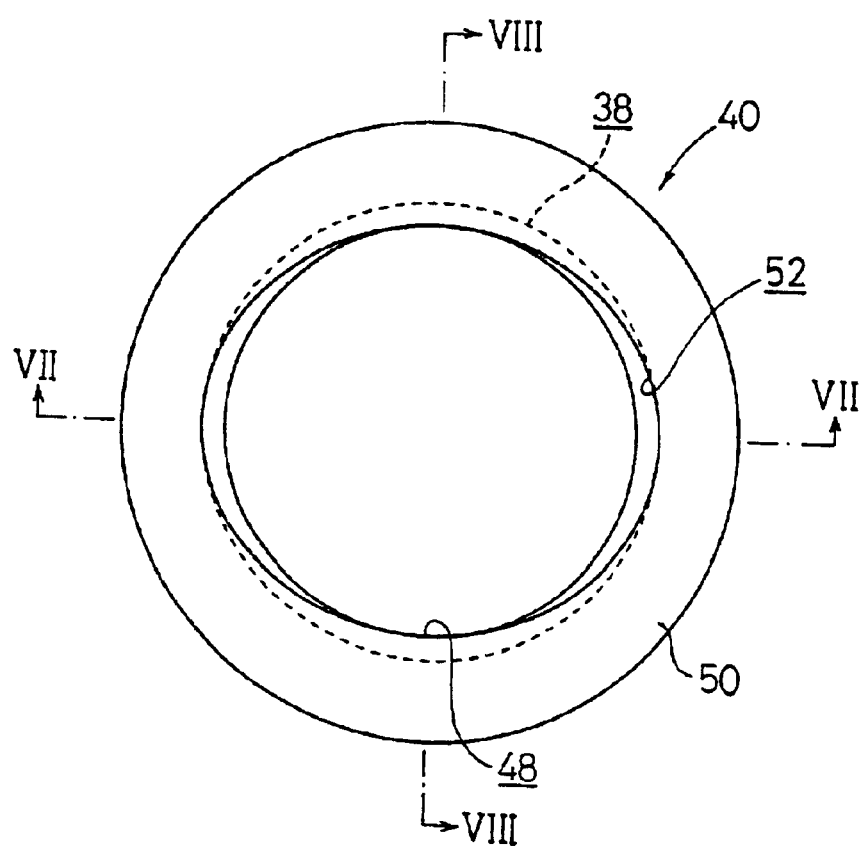
FIG. 6 is a plan view showing the inner roller shown in FIG. 5.
Figure 7:
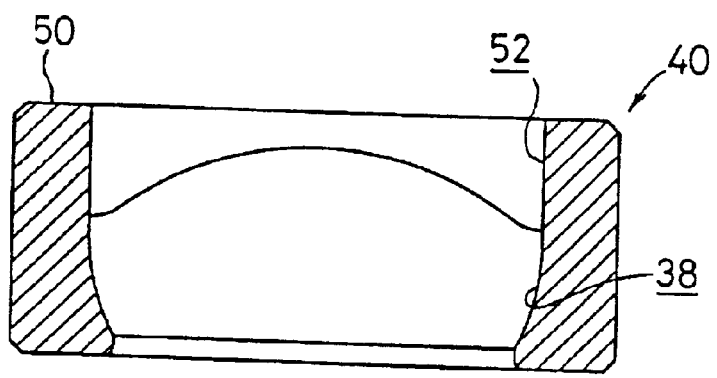
FIG. 7 is a vertical sectional view taken along a line VII—VII shown in FIG. 6.
Figure 8:
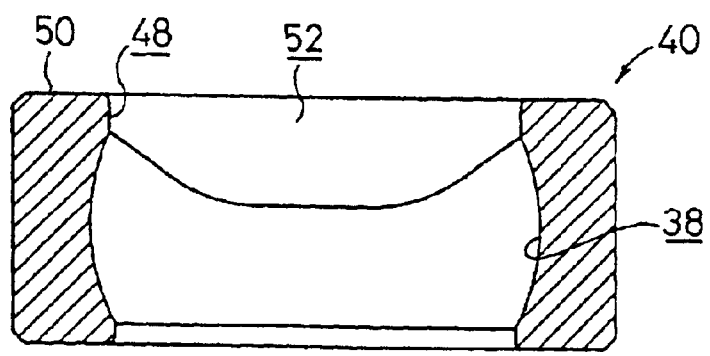
FIG. 8 is a vertical sectional view taken along a line VIII—VIII shown in FIG. 6.
Figure 9:
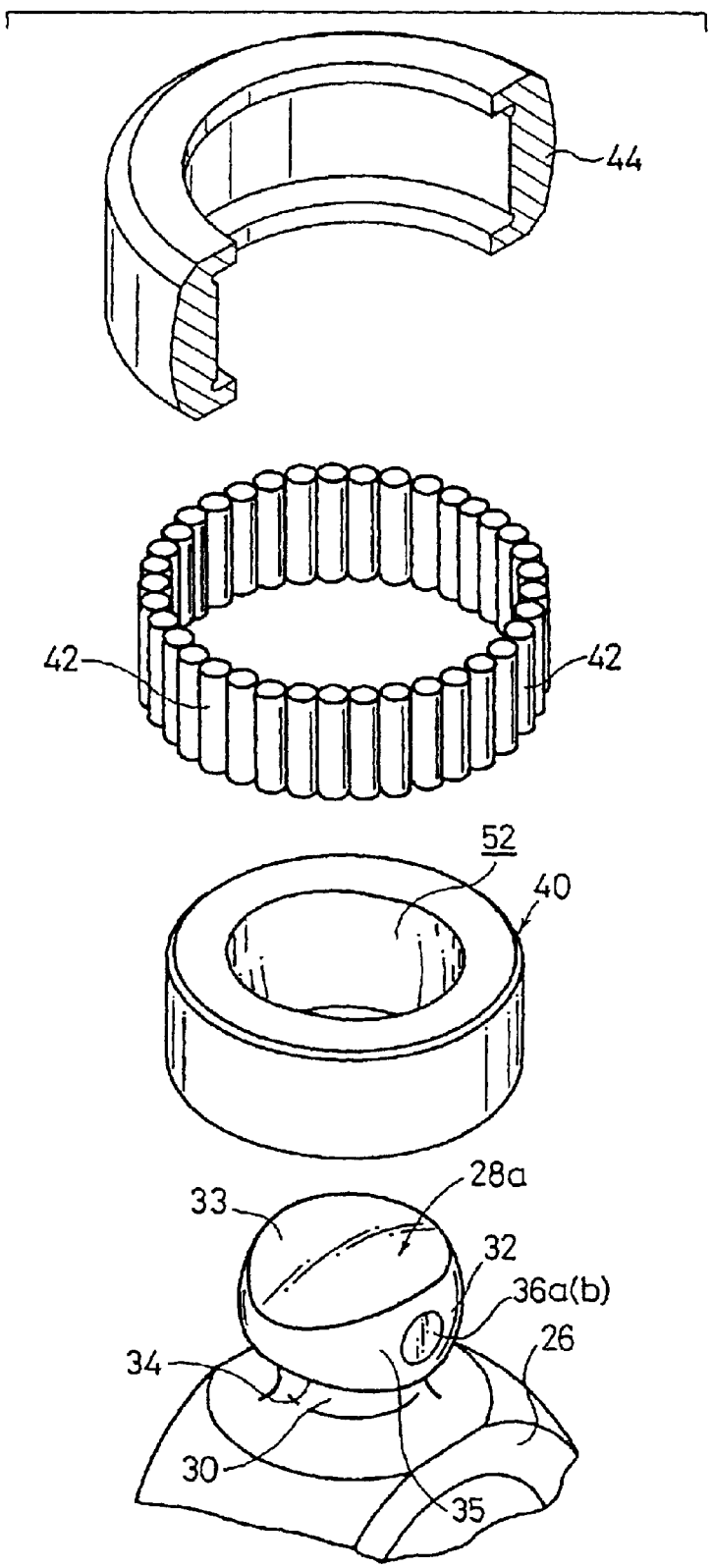
FIG. 9 is an exploded perspective view with partial cutout showing an inner member to be installed to the trunnion.
Figure 10:
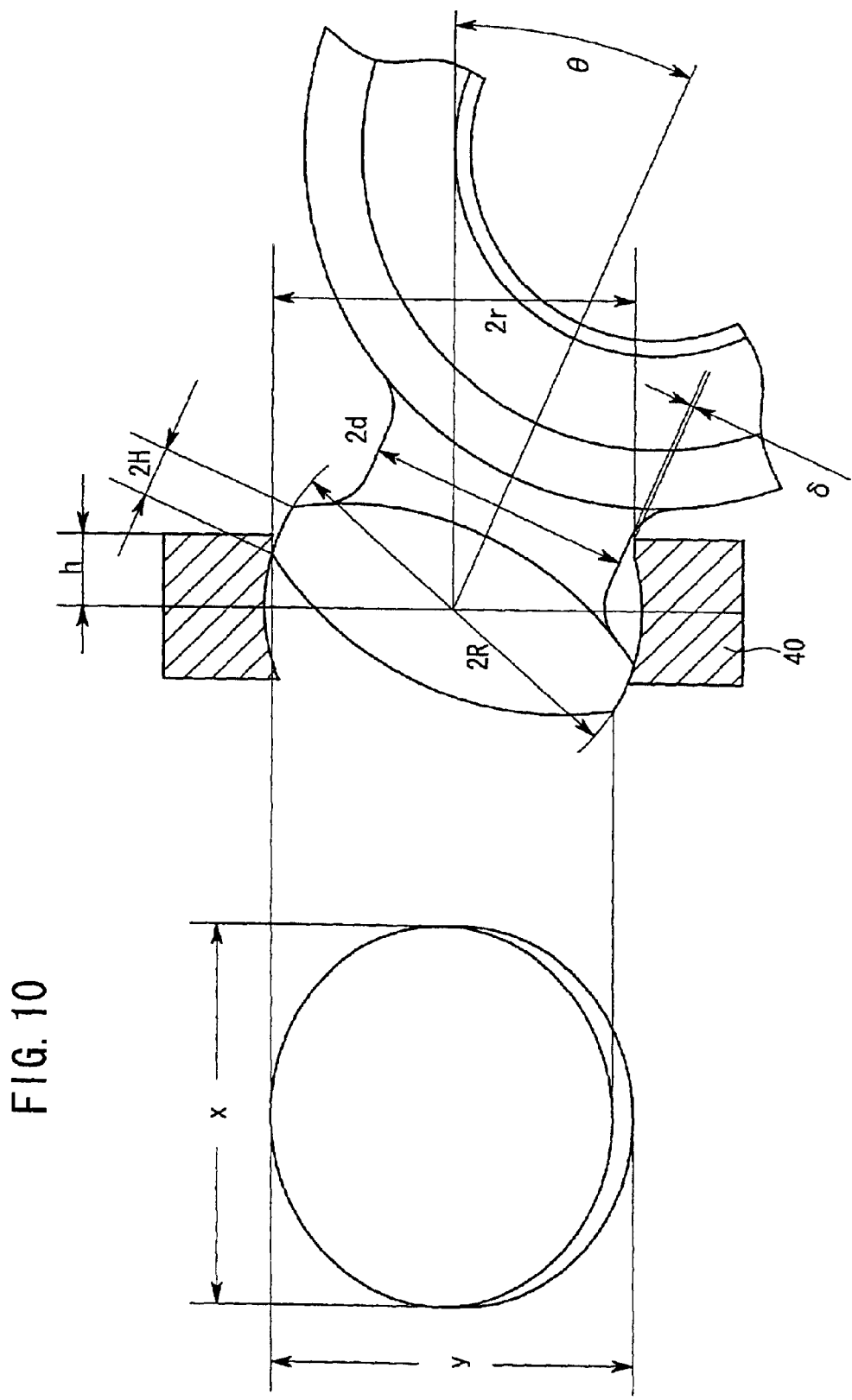
FIG. 10 illustrates dimensional conditions for installing the inner roller to the trunnion.

As shown in FIGS. 5 to 8, the inner roller 40 has a substantially elliptic cutout 52 at the boundary between an upper surface section 50 and an inner wall, so that the trunnion 28a (28b, 28c) can be assembled easily into the recess 48 of the inner roller 40. The inner roller or annular member 40 including a non-circular opening with a non-spherical interior cutout surface 52 that is in contact with the spherical recess 38. As illustrated in FIG. 6 and 10, the non-circular opening may be an elliptical opening and the non-spherical interior cutout surface 52 may be an elliptical surface.

In this arrangement, the spherical surface 35 of the trunnion 28a to 28c and the recess 38 of the inner roller 40 make surface-to-surface contact with each other. Therefore, as shown in FIG. 3, the trunnion 28a to 28c is rotatable in the direction of the arrow A about the point O with respect to the inner roller 40. Further, the trunnion 28a to 28c is rotatable in the circumferential direction (direction of the arrow B) along the spherical surface about the axis of the trunnion 28a to 28c. The trunnion 28a to 28c and the inner roller 40 are displaceable in the vertical direction (direction of the arrow C) together with the needle bearings 42 supported by the outer roller 44.

The constant velocity universal joint 10 according to the first embodiment of the present invention is basically constructed as described above. Next, its operation, function, and effect will be explained.

When the first shaft 12 as a transmission shaft is rotated, a rotary force is transmitted to the inner member 18 via the outer cup 14. The second shaft 16 is rotated in a predetermined direction by the aid of the trunnions 28a to 28c.

That is, the rotary force of the outer cup 14 is transmitted to the inner rollers 40 via the needle bearings 42 and the outer rollers 44 which make contact with the guide grooves 20a to 20c. Further, the rotary force is transmitted to the trunnions 28a to 28c via the spherical surfaces 35 which make surface-to-surface contact with the recesses 38 of the inner rollers 40. Accordingly, the second shaft 16, which is engaged with the trunnions 28a to 28c, is rotated.

In this arrangement, when the second shaft 16 is inclined by a predetermined angle with respect to the outer cup 14 having the first shaft 12, then the trunnions 28a to 28c make sliding displacement in the direction of the arrow A about the points 0 as shown in FIG. 3, or the trunnions 28a to 28c make sliding displacement in the circumferential direction (direction of the arrow B) along the spherical recesses 38 about the axes of the trunnions 28a to 28c. At this time, the spherical surfaces 35 of the trunnions 28a to 28c remain in surface-to-surface contact with the spherical recesses 38 of the inner rollers 40.

The trunnions 28a to 28c are displaceable in the axial directions (direction of the arrow C) of the trunnions 28a to 28c together with the inner rollers 40 which make sliding movement with respect to the needle bearings 42 supported by the outer rollers 44.

The trunnions 28a to 28c are displaceable in the directions substantially perpendicular to the axes of the trunnions 28a to 28c, i.e., in the longitudinal directions (direction of the arrow D) of the guide grooves 20a to 20c (see FIG. 2) by the aid of the outer rollers 44 which make sliding movement along the guide grooves 20a to 20c.

As described above, the rotary motion of the first shaft 12 is smoothly transmitted to the second shaft 16 regardless of the angle of inclination of the second shaft 16 with respect to the outer cup 14.

Next, a method of assembling the constant velocity universal joint 10 according to the first embodiment will be explained below. As an example, the trunnion 28a (28b, 28c) is installed into the hole 48 of the inner roller 40.

As shown in FIG. 10, the trunnion 28a (28b, 28b) is inclined by an angle θ with respect to the inner roller 40 having the substantially elliptic cutout 52, and the trunnion 28a (28b, 28c) is inserted along the substantially elliptic cutout 52. Accordingly, the inner roller 40 is installed to the trunnion 28a (28b, 28c). In this case, the second shaft 16 extends in the direction substantially perpendicular to the plane of paper in FIG. 10.

In the first embodiment, the pair of substantially circular flat surface sections 36a, 36b are formed by cutting out the parts of the spherical surface 35 of the trunnion 28a (28b, 28c), to which no torque is applied. Therefore, the length of the projection long width X of the spherical surface 35 of the trunnion 28a (28b, 28c) can be shortened by an amount corresponding to the cutout. The inner roller 40 can be installed to the trunnion 28a (28b, 28c) with ease. Therefore, it is possible to simplify the operation for assembling the inner roller 40 to the trunnion 28a (28b, 28c), and it is possible to improve the assembling performance.

The flat surface sections 36a, 36b, which are formed on the outer circumferential surface of the trunnion 28a (28b, 28c), function as oil sumps for lubricating oil. Accordingly, it is possible to improve lubrication characteristics, rotary driving force-transmitting property and durability.

In FIG. 10, θ represents the assembling angle, R represents the radius of the spherical surface 35 of the trunnion 28a (28b, 28c), H represents the half spherical surface width of the trunnion 28a (28b, 28c), r represents the short radius of the cutout 52 of the inner roller 40, h represents the half width of the inner roller 40, d represents the radius of the neck 30 of the trunnion 28a (28b, 28c), X represents the projection long width of the spherical surface 35 of the trunnion 28a (28b, 28c) when the assembling angle is inclined by θ, Y represents the projection short width of the spherical surface 35 of the trunnion 28a (28b, 28c) when the assembling angle is inclined by θ, and δ represents the clearance between the cutout 52 of the inner roller 40 and the neck 30 of the trunnion 28a (28b, 28c).

In this arrangement, the condition, under which the projection short width Y of the spherical surface 35 of the trunnion 28a (28b, 28c) is smaller than 2R (diameter of the spherical surface 35), i.e., the spherical surface 35 reliably falls within the half width h of the inner roller 40, is represented by the following expression (1).

$$R-r>0 \qquad (1)$$

The condition, under which Y<X is satisfied, is represented by the following expression (2).

$$\theta - \sin^{-1}\frac{H}{R} > 0 \qquad (2)$$

The condition, under which the trunnion 28a (28b, 28c) and the inner roller 40 make no interference, is represented by the following expression (3).

$$\sqrt{r^2+h^2} \cdot \sin\left(\tan^{-1}\frac{h}{r}-\theta\right)-d > 0 \qquad (3)$$

The shapes of the trunnion 28a (28b, 28c) and the cutout 52 of the inner roller 40 a re designed so that the expressions (1), (2), (3) are satisfied. It is assumed that the assembling angle θ is larger than the angle defined by the axis of the inner roller 40 and the axis of the trunnion 28a (28b, 28c) determined on the basis of the operation angle (angle defined by the first shaft 12 and the second shaft 16) of the constant velocity universal joint 10 on the plane of paper in FIG. 10 (plane including the axial centers of the three trunnions 28a to 28c).

When the expressions (1), (2), (3) are satisfied, and the assembling operation is performed without forcibly inserting the trunnion 28a (28b, 28c) into the cutout 52 of the inner roller 40, the following expression (4) is preferably satisfied.

$$r-H\sin\theta+\sqrt{R^2-H^2}\cdot\cos\theta > 0 \qquad (4)$$

Further, when the expressions (1), (2), (3) are satisfied, and the assembling operation is performed while forcibly inserting the trunnion 28a (28b, 28c) into the cutout 52 of the inner roller 40, the following expression (5) is preferably satisfied.

$$r-H\sin\theta+\sqrt{R^2-H^2}\cdot\cos\theta \leq 0 \qquad (5)$$

If the size of the cutout 52 falls within the range which is twice the operation angle of the constant velocity universal joint 10, it is possible to improve rotary driving force-transmitting property and durability. If the size of the cutout 52 is not less than twice the operation angle, it is possible to improve forging characteristics.

FIGS. 11 to 14 show first to third modified embodiments of the cutout surface formed on the part of the spherical surface 35 of the trunnion 28a (28b, 28c), to which no torque is applied.

Figure 11:
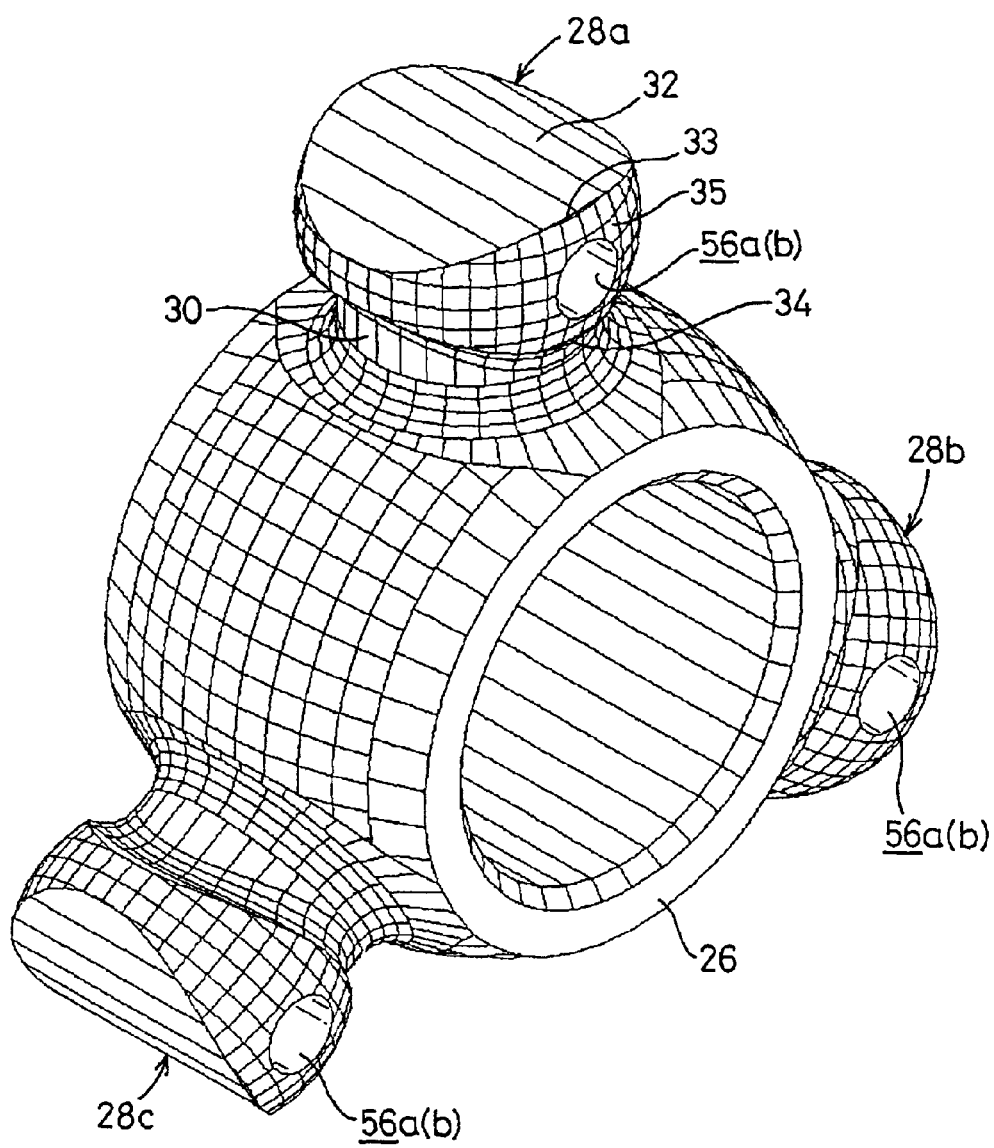
FIG. 11 is a magnified perspective view showing a cutout surface of a trunnion according to a first modified embodiment.

As shown in FIG. 11, in the first modified embodiment, a pair of bores 56a, 56b, each of which has a substantially circular cross section, are formed oppositely, in place of the flat surface sections 36a, 36b. It is preferable that the pair of bores 56a, 56b do not communicate with each other.

Figure 12:
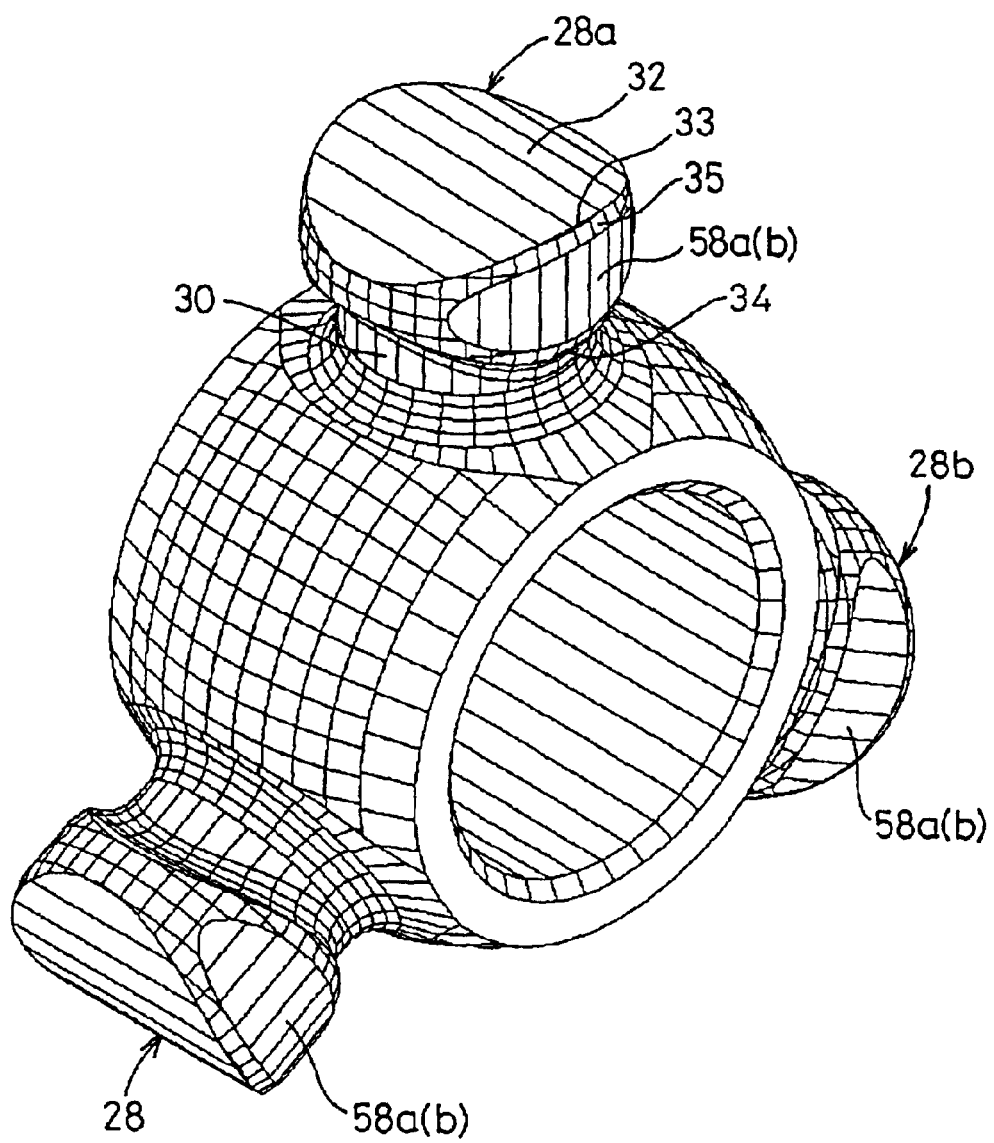
FIG. 12 is a magnified perspective view illustrating a cutout surface of a trunnion according to a second modified embodiment.
Figure 13:
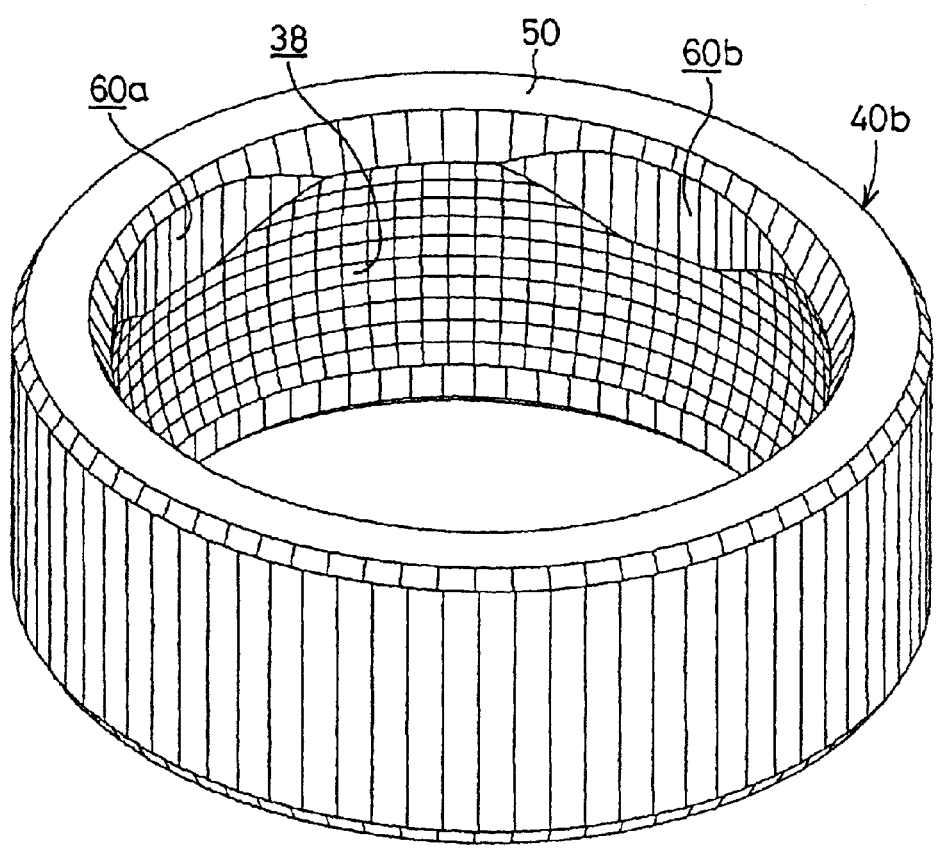
FIG. 13 is a magnified perspective view showing an inner roller to be installed to the trunnion shown in FIG. 12.

As shown in FIG. 12, in the second modified embodiment, a pair of curved surface sections 58a, 58b, each of which extends by a predetermined length in the circumferential direction, are formed oppositely on parts of the spherical surface 35. Each of the curved surface section 58a, 58b has a substantially central wide portion which is gradually narrowed toward its ends in the circumferential direction. In this arrangement, as shown in FIG. 13, it is preferable that curved surface sections 60a, 60b, which correspond to the curved surface sections 58a, 58b of the trunnion 28a (28b, 28c), are formed on the inner circumferential surface of the inner roller 40b.

In the first and second modified embodiments as described above, the contact area between the spherical surfaces of the trunnion 28a to 28c and the inner roller 40 is increased. Therefore, rotary driving force-transmitting property is stabilized, and it is possible to improve durability.

Figure 14:
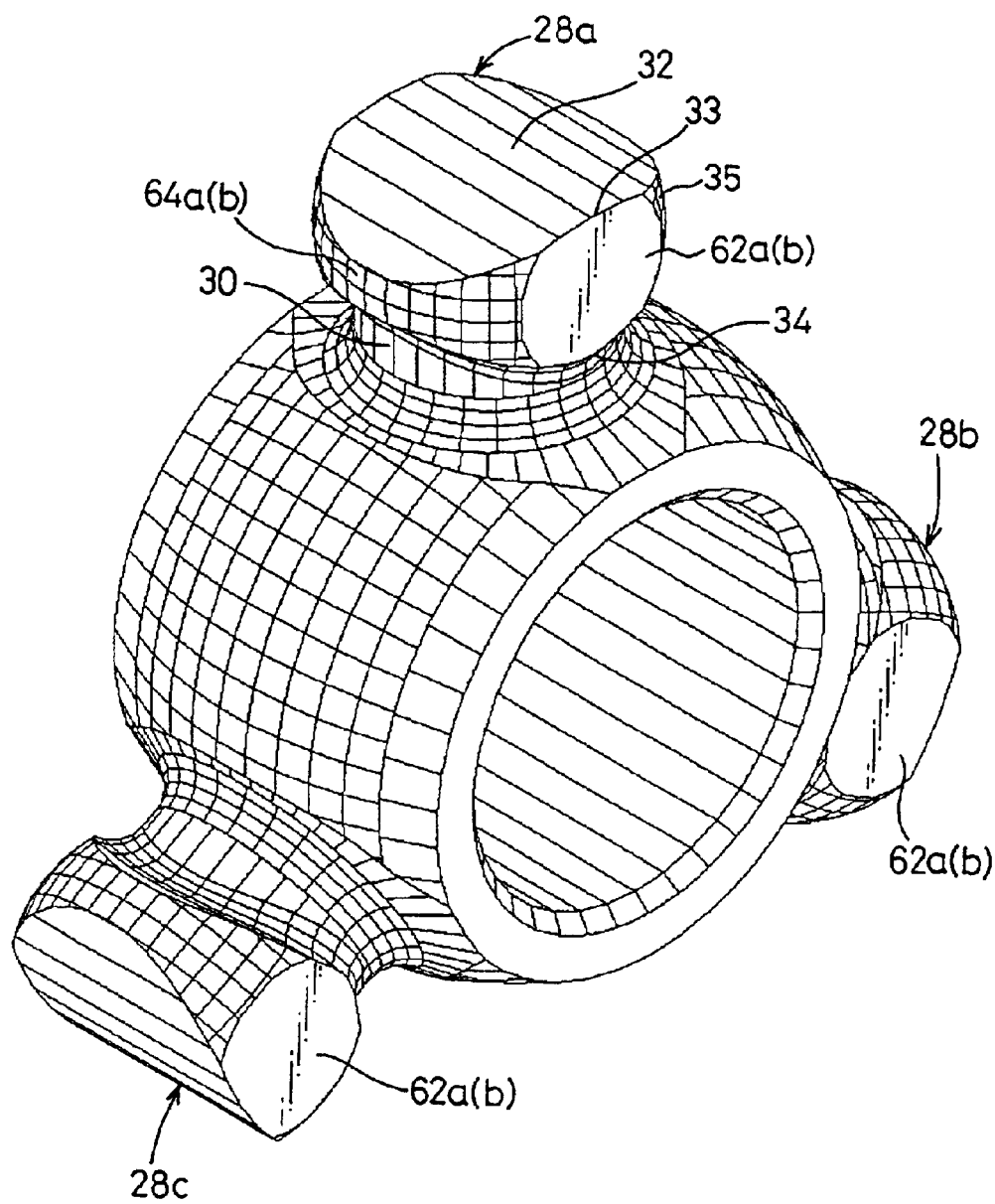
FIG. 14 is a magnified perspective view showing a cutout surface of a trunnion according to a third modified embodiment.

Further, as shown in FIG. 14, in the third modified embodiment, a pair of wide flat surfaces 62a, 62b are formed oppositely on parts of the spherical surface 35. With the pair of wide flat surfaces 62a, 62b, it is possible to improve fluidity of metal lump for forming parts 64a, 64b of the spherical surface during the forging process.

The other function and effect of the cutout surface of the first to third modified embodiments are the same as those of the first embodiment described above, detailed explanation of which will be omitted.

Figure 15:
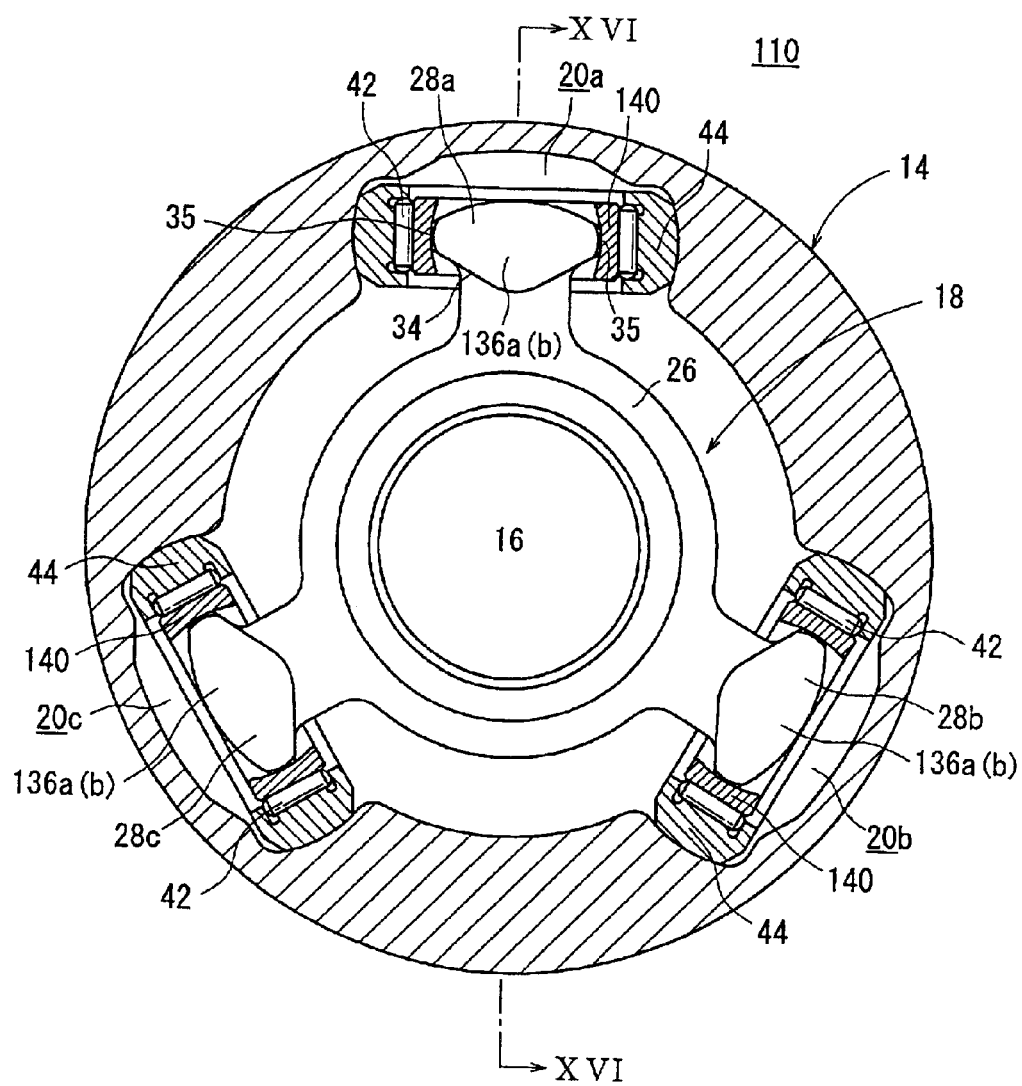
FIG. 15 is a vertical sectional view showing a constant velocity universal joint, in a direction substantially perpendicular to an axis of the constant velocity universal joint, according to a second embodiment of the present invention.
Figure 16:
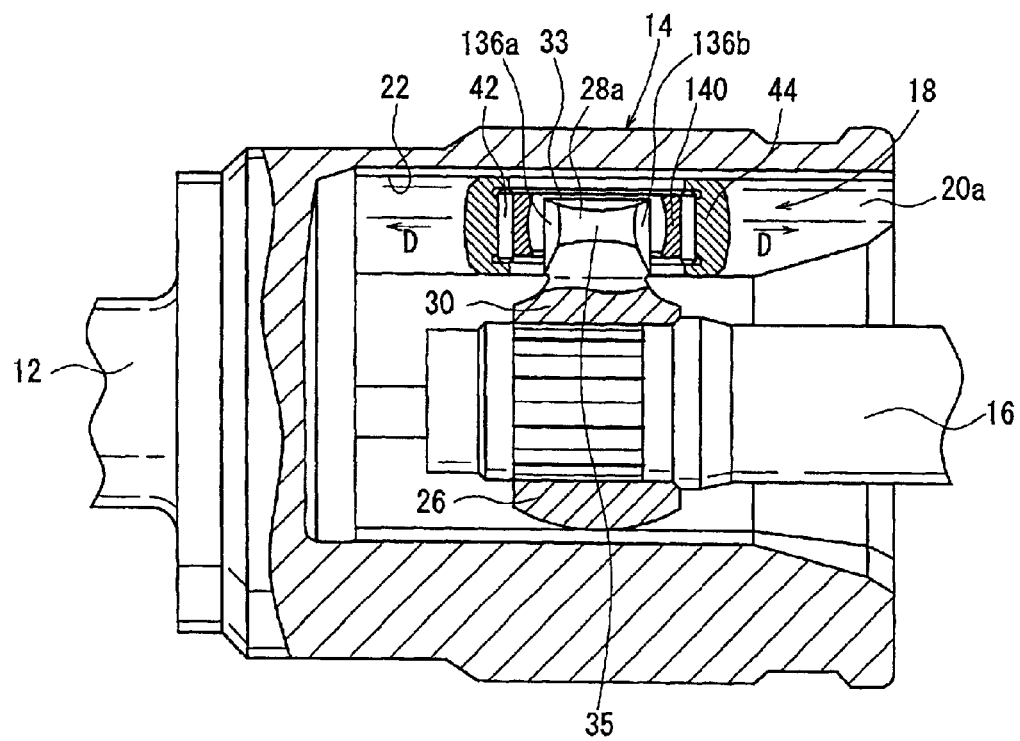
FIG. 16 is a vertical sectional view showing the constant velocity universal joint taken along a line XVI—XVI shown in FIG. 15.
Figure 17:
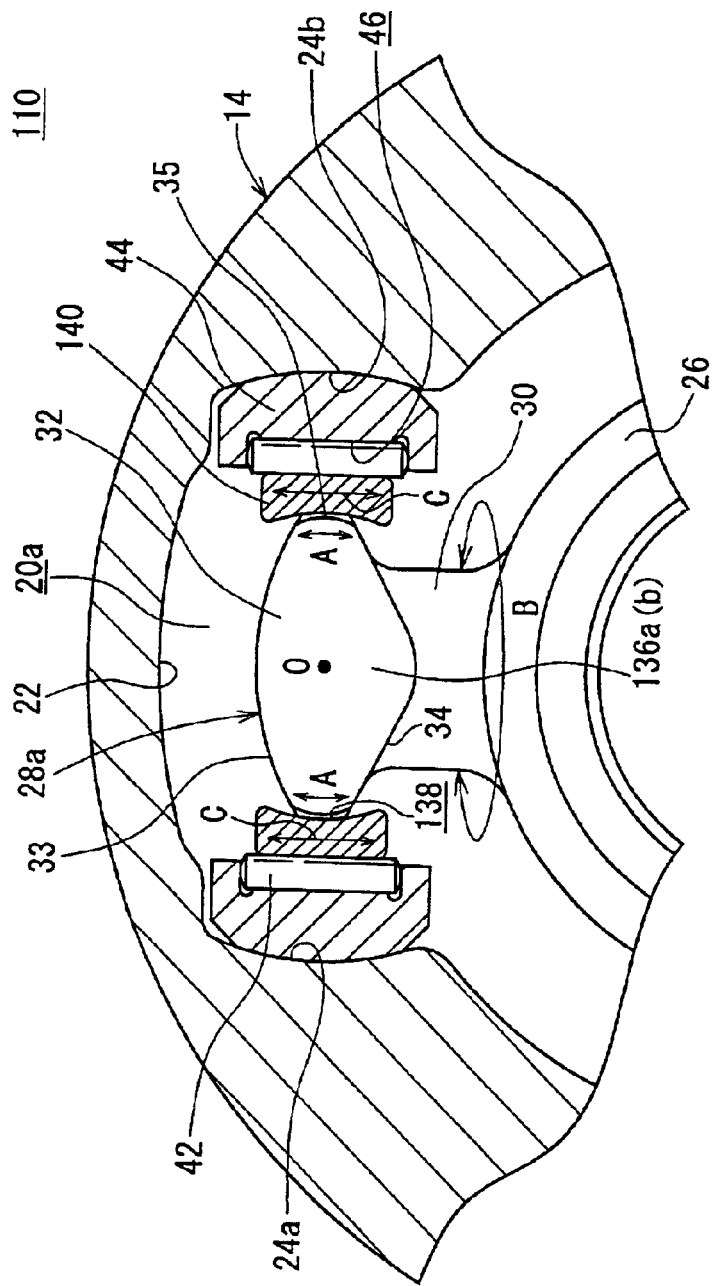
FIG. 17 is a magnified vertical sectional view with partial omission showing the constant velocity universal joint shown in FIG. 15.

Next, a constant velocity universal joint 110 according to a second embodiment of the present invention is shown in FIGS. 15 to 17. The same constitutive components as those of the constant velocity universal joint 10 according to the first embodiment are designated by the same reference numerals, detailed explanation of which will be omitted.

The same features of the constant velocity universal joint 110 according to the second embodiment as those described in connection with the method of assembling the constant velocity universal joint 10 according to the first embodiment as shown in FIG. 10 will not be described again. Only different function and effect will be described in detail below.

In the constant velocity universal joint 110, a second curved surface 34, which has a radius of curvature different from that of a first curved surface 33, is continued to a neck 30 under a head 32 of each of trunnions 28a to 28c. Further, the head 32 has a spherical surface 35 (indicated by a pair of divided spherical surfaces 35a, 35b, if necessary) formed on the outer circumferential surface between the first curved surface 33 and the second curved surface 34 (see FIGS. 17 and 18).

Figure 18:
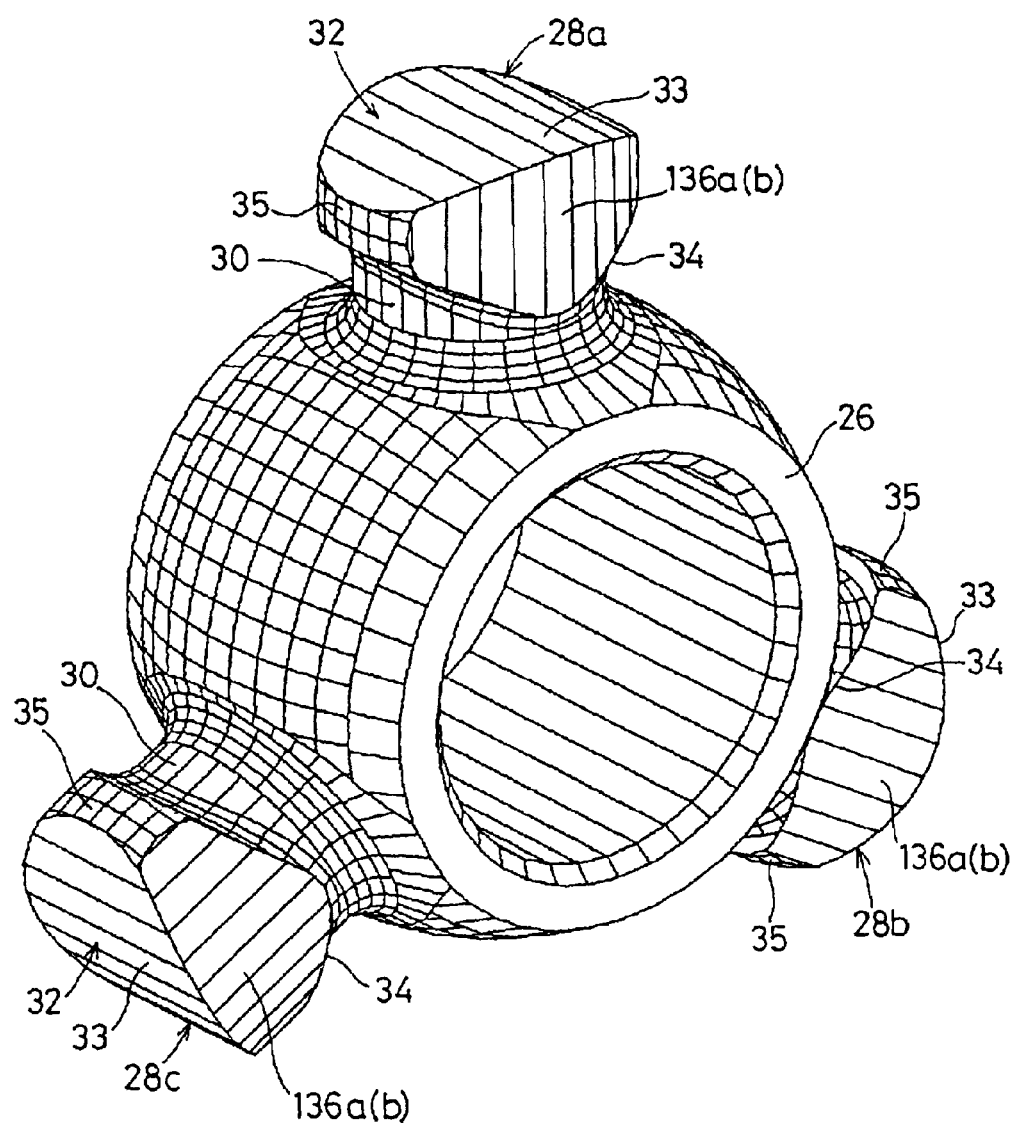
FIG. 18 is a magnified perspective view showing a plurality of trunnions including a spider boss section of the constant velocity universal joint shown in FIG. 15.

As shown in FIG. 18, a pair of cutout surfaces 136a, 136b, which are gently curved in the circumferential direction, are formed oppositely by cutting out parts of the spherical surface 35 on side surfaces of the head 32, to which no torque is applied between the first curved surface 33 and the second curved surface 34 of the head 32. Each of the cutout surface 136a, 136b has a substantially central wide portion which is gradually narrowed toward its ends in the circumferential direction. Therefore, the side surfaces of the head 32 in the circumferential direction include the pair of opposite cutout surfaces 136a, 136b each of which is formed by the cutout by the predetermined length in the circumferential direction, and the pair of mutually divided spherical surfaces 35a, 35b which are continued to the cutout surfaces 136a, 136b.

The cutout surface 136a, 136b is not limited to the curved surface. The cutout surface 136a, 136b may be an unillustrated flat surface. Alternatively, the cutout surface 136a, 136b may be a composite surface comprising a curved surface and a flat surface.

Figure 19:
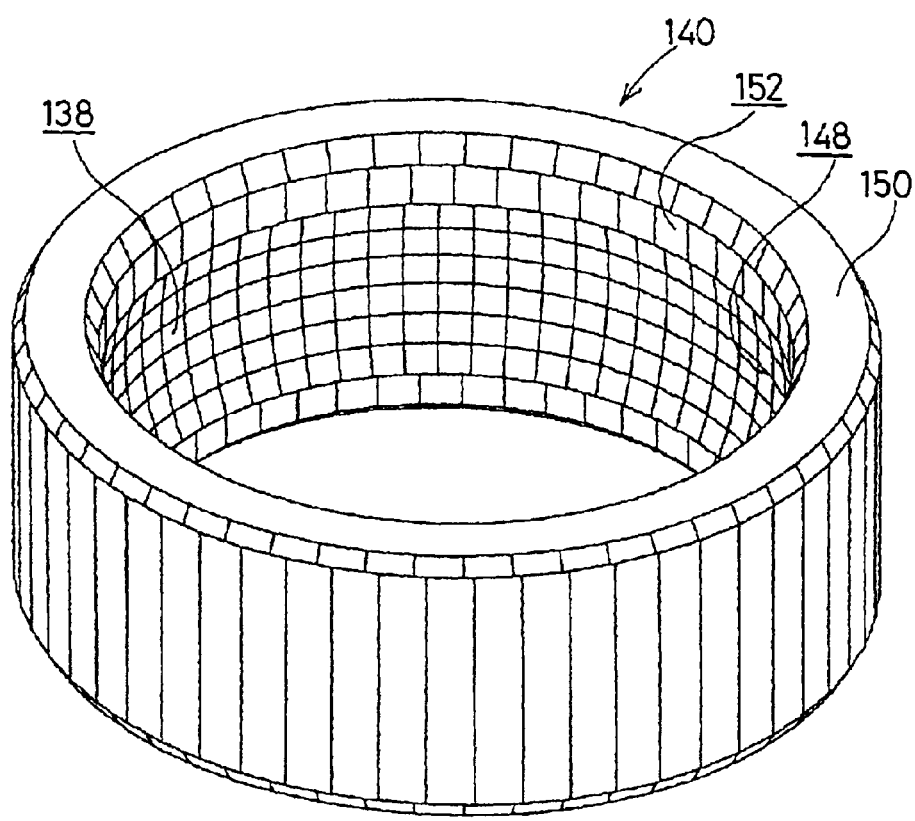
FIG. 19 is a magnified perspective view showing an inner roller to be installed to the trunnion shown in FIG. 18.
Figure 20:
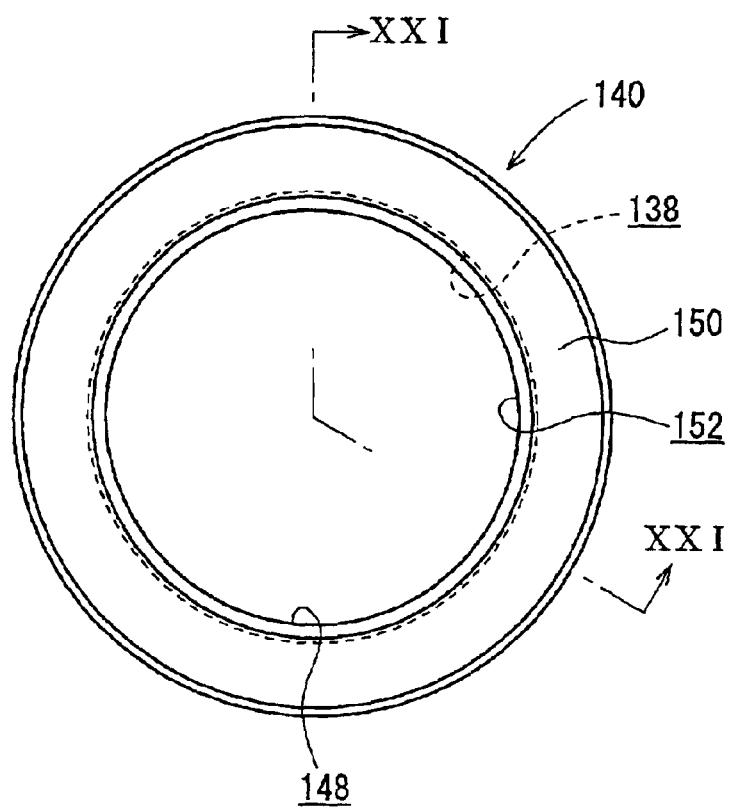
FIG. 20 is a plan view showing the inner roller shown in FIG. 19.
Figure 21:
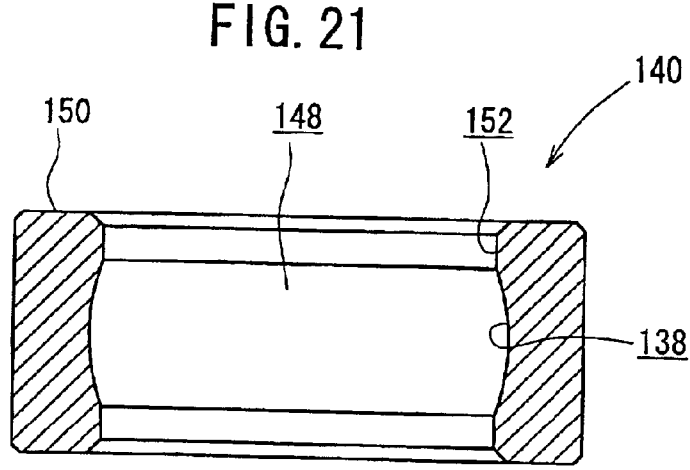
FIG. 21 is a vertical sectional view taken along a line XXI—XXI shown in FIG. 20.

As shown in FIGS. 19 to 21, an inner roller 140 has a perfectly circular opening 152 (perfect circle) which is formed between an upper surface section 150 and an inner wall surface so that the trunnion 28a (28b, 28c) can be easily assembled in a hole 148 of the inner roller 140. When the shape of the opening 152 is the perfect circle, the trunnion 28a (28b, 28c) can be easily assembled in any circumferential direction in the hole 148 of the inner roller 140 as described later on. The assembling operation is performed regardless of assembling orientation.

The constant velocity universal joint 110 according to the second embodiment of the present invention is basically constructed as described above. Next, a method of assembling the constant velocity universal joint 110 will be explained below. As an example, the trunnion 28a (28b, 28c) is installed into the hole 148 of the inner roller 140.

Figure 22:
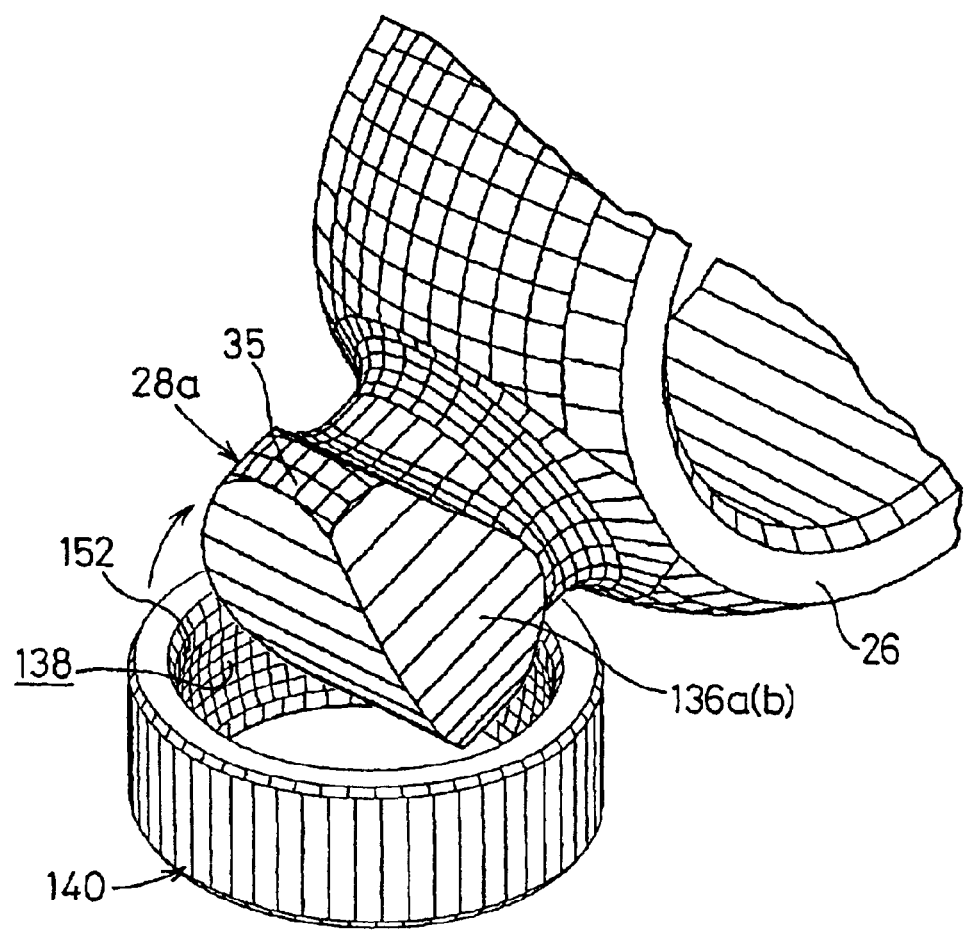
FIG. 22 is a perspective view with partial omission showing a state in which the inner roller shown in FIG. 19 is installed to the trunnion.

As shown in FIG. 22, the trunnion 28a (28b, 28c) is inserted in any of directions in the circumferential direction of the perfectly circular opening 152 of the inner roller 140 while inclining the trunnion 28a (28b, 28c) by an angle θ with respect to the inner roller 140. Accordingly, the inner roller 140 is installed to the trunnion 28a (28b, 28c).

In the constant velocity universal joint 110, the pair of opposite cutout surfaces 136a, 136b are formed by cutting out the parts of the spherical surface 35 of the trunnion 28a (28b, 28c), to which no torque is applied. Therefore, the length of the projection long width X of the spherical surface 35 of the trunnion 28a (28b, 28c) can be shortened by an amount corresponding to the cutout. The inner roller 140 can be installed to the trunnion 28a (28b, 28c) with ease.

For example, if the shape of the opening 152 of the inner roller 140 is substantially elliptic, the orientation of the assembling operation is limited to the major axis direction. In contrast, in the constant velocity universal joint 110, as shown in FIG. 22, the trunnion 28a(28b, 28c) is inserted in the recess 138 of the inner roller 140 along the pair of cutout surfaces 136a, 136b. Accordingly, the inner roller 140 is easily installed to the trunnion 28a (28b, 28c). The orientation of the assembling operation is not limited.

In other words, when the shape of the opening 152 of the inner roller 140 is the perfect circle, the trunnion 28a (28b, 28c) can be easily assembled in any circumferential direction with respect to the hole 148 of the inner roller 140. Therefore, the operation can be performed regardless of orientation of assembling.

As a result, it is possible to simplify the operation for assembling the inner roller 140 to the trunnion 28a (28b, 28c). Further, it is unnecessary to consider the orientation of the assembling of the trunnion 28a (28b, 28c) with respect to the inner roller 140. Therefore, it is possible to improve assembling performance.

The cutout surfaces 136a, 136b, which are formed on the outer circumferential surface of the trunnion 28a (28b, 28c), function as oil sumps for lubricating oil to be charged into the clearance between the trunnion 28a (28b, 28c) and the recess 138 of the inner roller 140. Accordingly, it is possible to improve lubrication characteristics, rotary driving force-transmitting property and durability.

Figure 23:
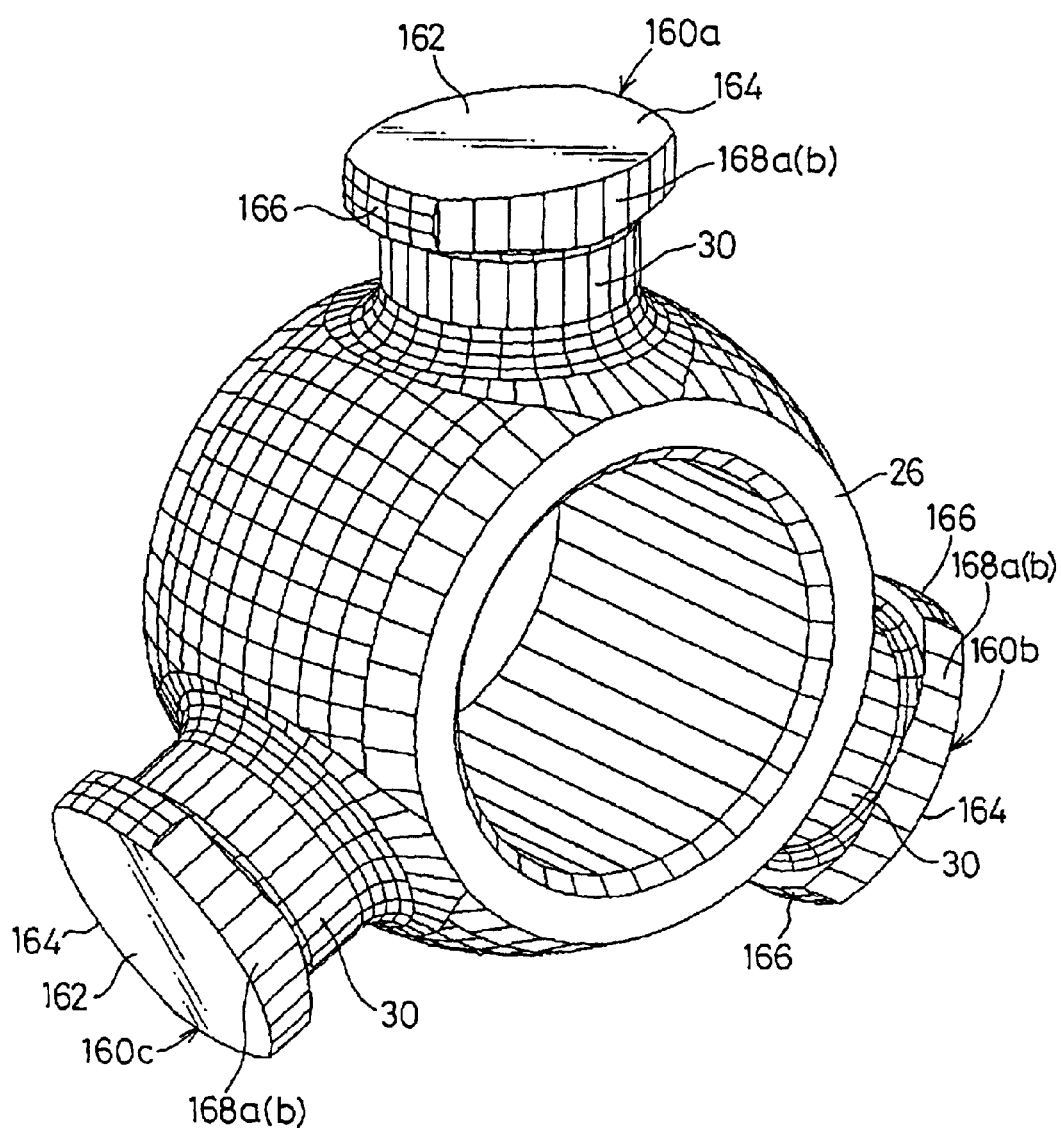
FIG. 23 is a magnified perspective view showing a cutout surface of a trunnion according to a fourth modified embodiment.

Next, FIG. 23 shows a trunnion 160a (160b, 160c) according to a fourth modified embodiment.

The trunnion 160a to 160c according to the fourth modified embodiment includes a substantially disk-shaped head 164 which has a flat surface 162 at the top. A pair of opposite spherical surfaces 166, and a pair of opposite cutout surfaces 168a, 168b formed by cutting out the spherical surface 166 are provided on the band-shaped outer circumferential surface of the substantially disk-shaped head 164.

Figure 24:
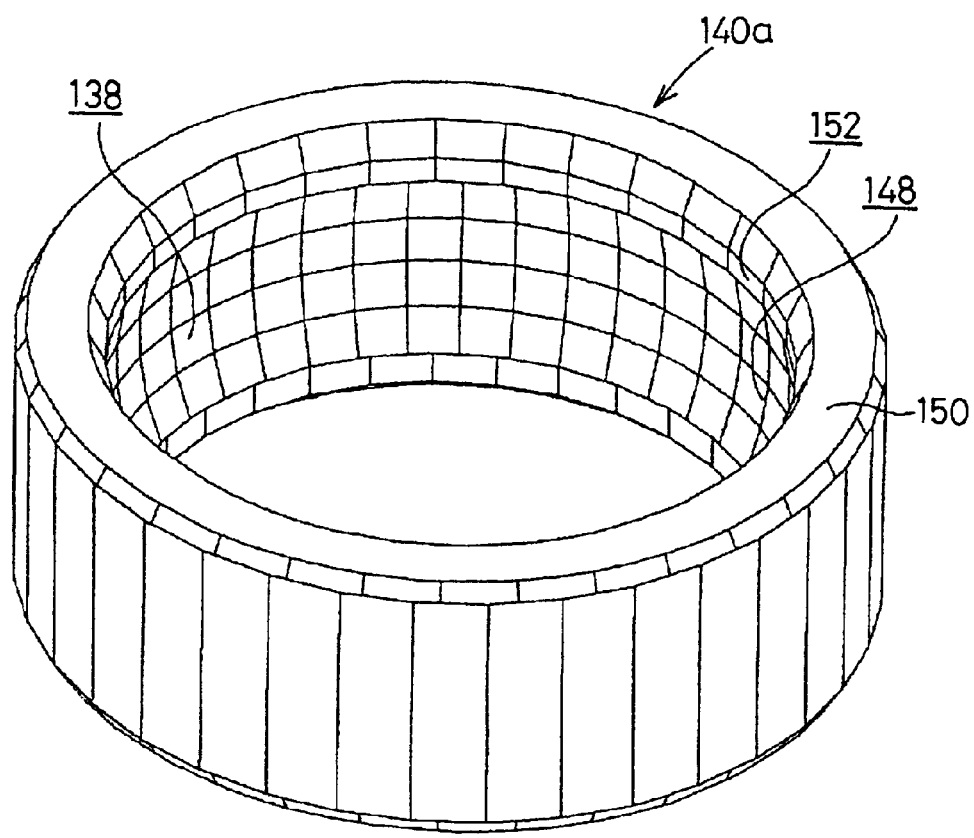
FIG. 24 is a magnified perspective view showing an inner ring to be installed to the trunnion shown in FIG. 23.

The substantially central portion of the band-shaped cutout surface 168a, 168b is slightly wide. However, the shape of the cutout surface 168a, 168b is not limited. The cutout surface 168a, 168b may be a flat surface, or a composite surface including a flat surface and a curved surface. FIG. 24 shows an inner roller 140a to be installed to the trunnion 160a to 160c shown in FIG. 23.

In the fourth modified embodiment, the head 164 of the trunnion 160a to 160c having the flat top surface 162 has the substantially disk-shaped configuration. Accordingly, the volume of the head 164 of the trunnion 160a to 160c is decreased. It is possible to suppress the load (pressurizing force) in forming the trunnion 160a to 160c in the forging process, and thus it is possible to improve forging performance. The other function and effect are the same as those of the trunnions 28a to 28c shown in FIG. 18, detailed explanation of which is omitted.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A constant velocity universal joint comprising:
   a cylindrical outer member connected to a transmission shaft, said outer member having guide grooves separated from each other by a predetermined spacing distance and extending in an axial direction on an inner circumferential surface of said outer member; and
   an inner member connected to another transmission shaft, said inner member being inserted into an opening in said outer member, said inner member including trunnions each having a spherical surface and annular members each having a spherical recess adapted to receive said spherical surface,
   wherein a cutout surface is formed on a part of said spherical surface of said trunnion, to which no torque is applied, an entire circumferential edge of said cutout surface being in contact with said spherical surface.

2. The constant velocity universal joint according to claim 1, wherein said cutout surface comprises a flat surface.

3. The constant velocity universal joint according to claim 2, wherein said cutout surface comprises a pair of opposite flat surfaces.

4. The constant velocity universal joint according to claim 1, wherein each of said annular members comprises a non-circular opening for insertion of said trunnion, said non-circular opening comprising a non-spherical interior cutout surface, said interior cutout surface being in contact with said spherical recess.

5. The constant velocity universal joint according to claim 4, wherein said non-circular opening is an elliptical opening and said non-spherical interior cutout surface is an elliptical surface.

6. A constant velocity universal joint comprising:
   a cylindrical outer member connected to a transmission shaft, said outer member having guide grooves separated from each other by a predetermined spacing distance and extending in an axial direction on an inner circumferential surface of said outer member; and
   an inner member connected to another transmission shaft, said inner member being inserted into an opening in said outer member, said inner member including trunnions each having a spherical surface and annular members each having a spherical recess adapted to receive said spherical surface,
   wherein a cutout surface is formed on a part of said spherical surface of said trunnion, to which no torque is applied, wherein an entire circumferential edge of said cutout surface is in contact with said spherical surface, and
   wherein each of said annular members comprises a non-circular opening for insertion of said trunnion, said noncircular opening comprising a non-spherical interior cutout surface, said interior cutout surface being in contact with said spherical recess.

7. The constant velocity universal joint according to claim 6, wherein said non-circular opening is an elliptical opening and said non-spherical interior cutout surface is an elliptical surface.

8. The constant velocity universal joint according to claim 6, wherein said cutout surface comprises a flat surface.

9. The constant velocity universal joint according to claim 8, wherein said cutout surface comprises a pair of opposite flat surfaces.

* * * * *